(12) United States Patent
Acker

(10) Patent No.: US 6,470,620 B1
(45) Date of Patent: Oct. 29, 2002

(54) FOLDING WATERFOWL DECOY

(76) Inventor: Thomas W. Acker, 5651 W. River Bend Rd., Dunnellon, FL (US) 34433

( * ) Notice: Subject to any disclaimer, the term of this patent is extended or adjusted under 35 U.S.C. 154(b) by 0 days.

(21) Appl. No.: 09/698,961

(22) Filed: Oct. 30, 2000

(51) Int. Cl.⁷ .............................................. A01M 31/06
(52) U.S. Cl. ..................................................... 43/3
(58) Field of Search ................................................ 43/3

(56) References Cited

U.S. PATENT DOCUMENTS

| | | | | |
|---|---|---|---|---|
| 760,683 A | * | 5/1904 | Coudon | 43/3 |
| 796,147 A | * | 8/1905 | Reynolds | 43/3 |
| 710,433 A | * | 10/1907 | Coudon | 43/3 |
| 2,246,574 A | * | 2/1940 | Coe | 43/3 |
| 2,952,090 A | * | 2/1958 | Pittenger | 43/3 |
| 6,082,036 A | * | 7/2000 | Cripe | 43/3 |

OTHER PUBLICATIONS

Photograph of a decoy assembly which was in use prior to Oct. 30, 1999.

* cited by examiner

*Primary Examiner*—Charles T. Jordan
*Assistant Examiner*—Danielle S. Rosenthal
(74) *Attorney, Agent, or Firm*—Donald R. Bahr

(57) ABSTRACT

The present invention is concerned with the art of waterfowl decoys and in particular a decoy assembly which incorporates a plurality of waterfowl bodies.

The assembly may be readily folded for storage and transport and opened and locked into position for usage. The decoy assembly comprises a central member which is flanked with a pair of secondary members. In usage these secondary members are locked into angular relationship with the central member. The assembly is molded from a high density, closed cell, polymeric material and incorporates integral molded locking means.

19 Claims, 3 Drawing Sheets

FOLDING WATERFOWL DECOY

FIELD OF THE INVENTION

The present invention relates generally to waterfowl decoys. The decoy assembly of this invention incorporates a plurality of decoy bodies. The decoy assembly can be folded up and locked for storage and transport. In usage the assembly is locked into an expanded stance. The decoy assembly of this invention is formed from a high density closed cell polymeric foam.

BACKGROUND OF THE INVENTION

The art of attracting waterfowl with decoys goes back thousands of years. From ancient history it is known that the ancients formed decoys from rushes, reeds and small twigs. Due to their construction these decoys were not suitable for use in a floating mode. The art of decoy manufacture progressed over the centuries until a high point was reached in the manufacture of decoys from carved wooden blocks. While many types of wood have been used as a raw material for carved decoys, cedar was a preferred material as the density of cedar is such that the resulting decoys would float in water in such a manner as to resemble a natural floating waterfowl. While cedar produced excellent decoys the cost of the raw materials and the labor content in making and carving the decoys has severely restricted its use in modem times.

Subsequently cork became the preferred raw material for the manufacture of waterfowl decoys. While cork has the proper buoyancy its usage has been restricted due to the excessive cost of natural cork.

With the advent of modern technology polymeric materials have become the most widely used materials for forming decoys over the past thirty five years. Decoys have been of three principal types these being hollow, solid and planar. Hollow decoys are usually formed from hard unfoamed polymeric materials. The solid decoys are in turn unusually formed from cellular polymeric materials. Lastly the planar decoys are usually formed from thin wood such as plywood. It is these latter mentioned planar decoys with which this invention is concerned.

Planar decoys are desirable in that they are light and easy to use and easy to manufacture. The planar decoys of this invention are formed from cellular polymeric materials such that the finished decoys float in the water in a manner which approximates live natural waterfowl.

In addition to the above described materials, fibrous materials may be shaped into decoys wherein the fibers have been waterproofed with a binder.

The above mentioned solid waterfowl decoys which are formed from a polymeric material which is foamed to produce a cellular structure, has achieved widespread commercial acceptance. In addition to being light in weight this type of decoy can be cheaply and easily manufactured and the flotation of the decoy can be easily regulated by controlling the density of the cellular polymeric material. Likewise the floatation of the planar decoy assembly of this invention is controlled, in part, by the density of the cellular material from which it is formed.

While many types of cellular materials can be used to form solid body decoys foamed polystyrene is the most widely used material due to the fact that it is low in cost and easy to form it into waterfowl decoy. High density foamed polystyrene is also the preferred material for use in the formation of the planar decoys of this invention.

It is understood by one skilled in the art that the above discussion relates to the body which is used to form the waterfowl decoy. For various reasons in the prior art decoy heads are formed from materials other than those used to form the above described decoy bodies. In accordance with this invention the decoy head is formed from the same material as the body of the decoy.

A common problem with all of the above described waterfowl decoys has been the fact that they are very bulky and hard to use. This problem has two aspects these being because the prior art decoys are bulky they are hard to transport and because they are bulky they are hard to place in a decoy layout. This invention is concerned with waterfowl decoys that are very compact and easy to use.

Waterfowl decoys are often used in large numbers. Spreads of one hundred or more decoys are not uncommon. Therefore, there is a need for a compact decoy system. This invention is concerned with a decoy system whereby multiple decoys are incorporated into a unitary structure which can be easily handled. Typically decoys are deployed one at a time. Because the structure of this invention incorporates multiple decoy units the need to handle single decoys one at a time is eliminated, hence large numbers of decoys can be easily deployed in a short period of time.

The prior art discloses planar wooden decoy assemblies which are formed from plywood wherein three decoy segments are joined together via two hinged pivot points. The three segments are locked into an operating stance by use of an elastic cord.

Accordingly, it is an object of this invention to provide a decoy assembly wherein a large number of decoys can be easily deployed.

It is a further object of this invention to provide a decoy assembly which can be readily and easily assembled and disassembled.

Likewise, it is an object of this invention to provide a decoy assembly which can be readily folded up and locked in a folded stance for storage and transport.

Also it is an object of this invention to provide a decoy assembly which incorporates a plurality of decoy bodies and yet is lightweight and easy to manufacture.

These objects and advantages should be construed as merely illustrative of some of the more prominent features and applications of the present invention. Many other beneficial results can be obtained by applying the disclosed invention in a different manner or by modifying the invention within the scope of the disclosure. Accordingly, other objects and advantages as well as a fuller understanding of this invention, in addition to the scope of the invention, is defined by the claims taken in conjunction with the accompanying drawings.

SUMMARY OF THE INVENTION

The invention is defined by the appended claims with the specific embodiment being shown in the attached drawings. For purpose of summarizing the invention, the invention may be described as an assembly which incorporates a plurality of decoy bodies which can be readily and easily assembled for deployment in a decoy layout.

This invention provides a means whereby a central member and a pair of secondary members can be rigidly secured one to another in a planar relationship for use in attracting waterfowl.

The decoy assembly of this invention has a central planar member which is adapted to pivotally engage a pair of secondary members. The central member and the secondary members all incorporate decoy assemblies and integral molded fastening segments whereby they may be snapped into a folded stance or into an expanded usage stance. The decoy assembly of this invention is molded from a high density, closed cell polymeric material.

The foregoing has outlined rather broadly the more pertinent and important features of the present invention in order that the detailed description of the invention that follows may be better understood whereby the present contribution to the art may be more fully appreciated. Additional features of the invention will be described hereinafter which form the subject of the claims of the present invention. It should be appreciated by those skilled in the art, that the conception and the specific embodiment disclosed herein may be readily utilized as a basis for modifying or designing other decoy assemblies for carrying out the purposes of the present invention. Further it should also be realized by those skilled in the art that such equivalent decoy assemblies do not depart from the spirit and scope of the invention as set forth in the appended claims.

DESCRIPTION OF THE PREFERRED EMBODIMENT

The subject invention relates to a multi decoy assembly which is used in waterfowl hunting.

Figure 1:
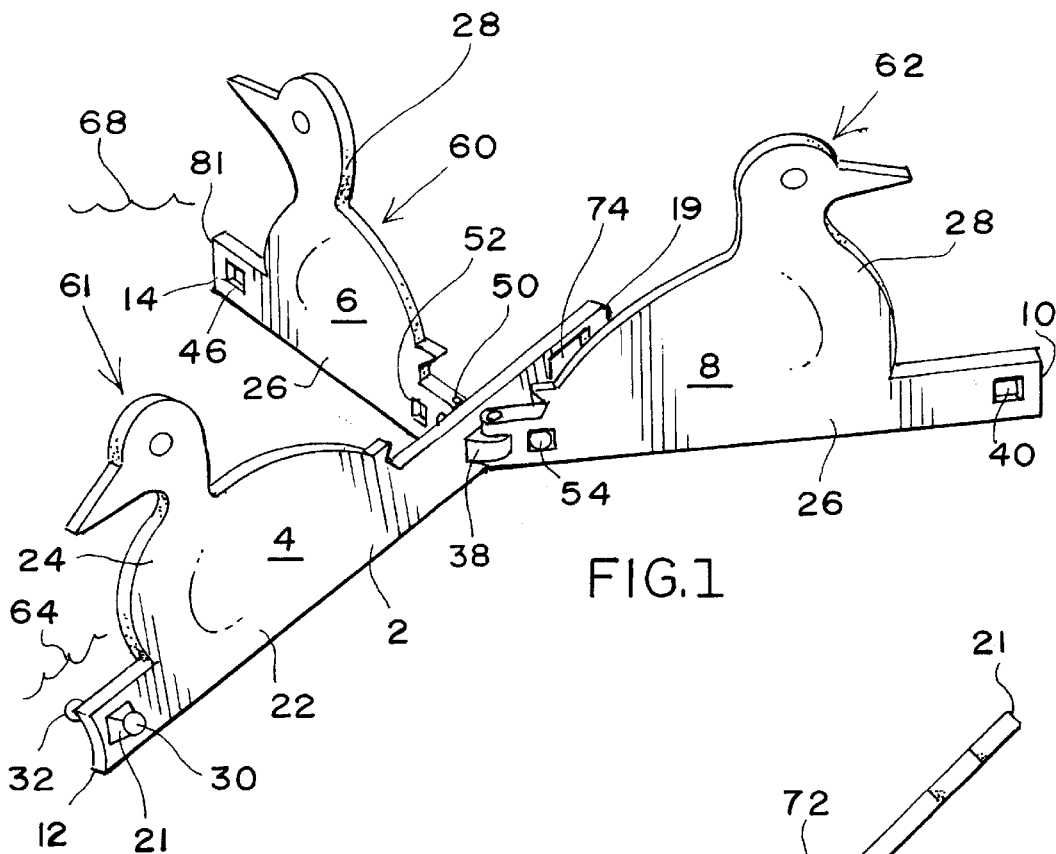
FIG. 1 is a perspective view of the finished waterfowl decoy assembly of this invention in an assembled stance.
Figure 2:
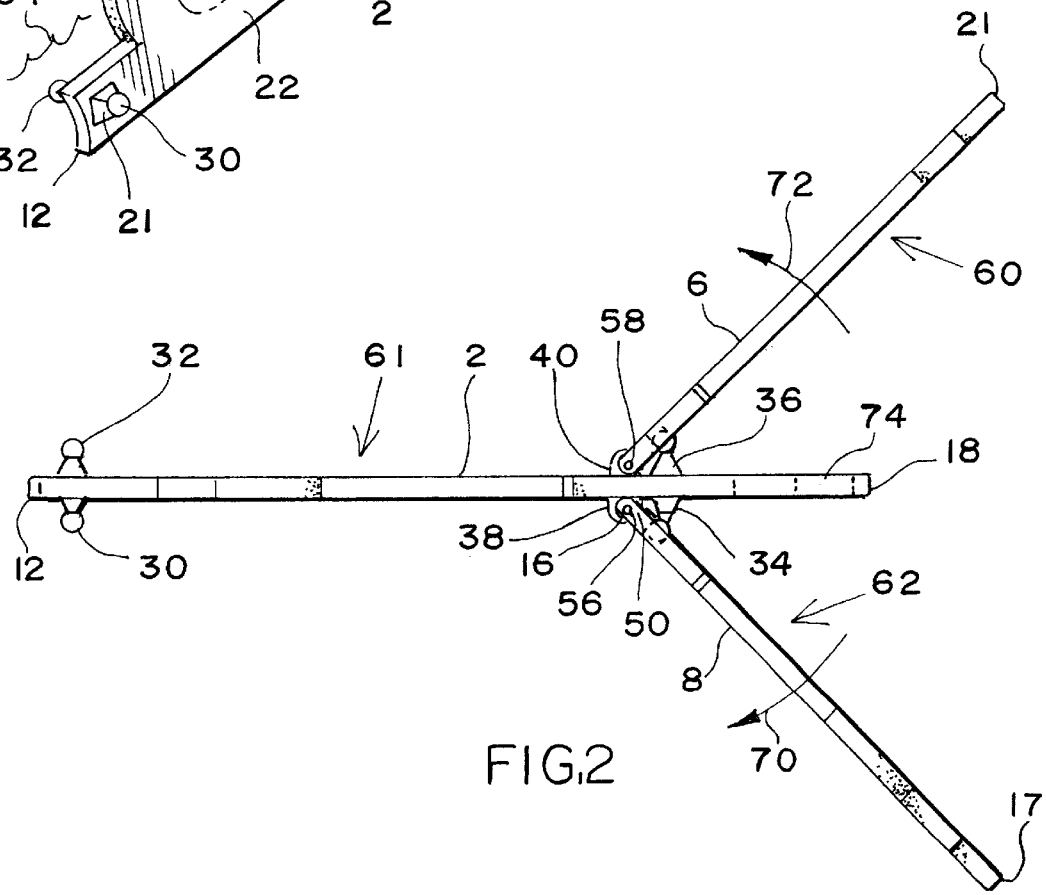
FIG. 2 is a top view of the waterfowl decoy assembly of this invention in an assembled ready to use stance.
Figure 3:
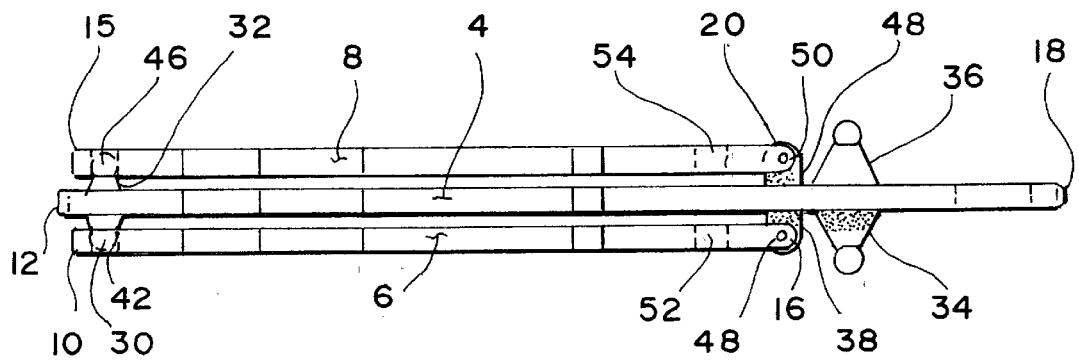
FIG. 3 is a top view of the waterfowl decoy assembly of this invention in a folded stance.

Referring to FIG. 1–3 it can be seen that decoy assembly 2 of this invention has three principal components these being a central member 4 and a pair of secondary members 6 and 8. Central member 4 and secondary members 6 and 8 have first terminal ends 10,12 and 14 and second terminal ends 16,18 and 20.

Figure 5:
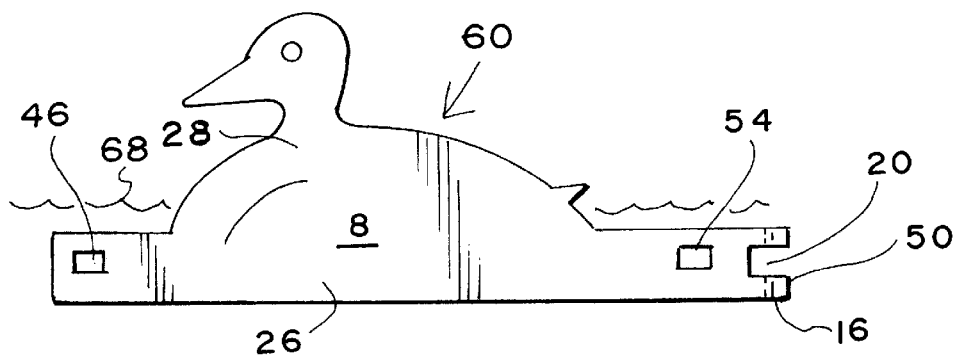
FIG. 5 is a side view of a secondary member of the waterfowl decoy assembly of the subject invention.
Figure 4:
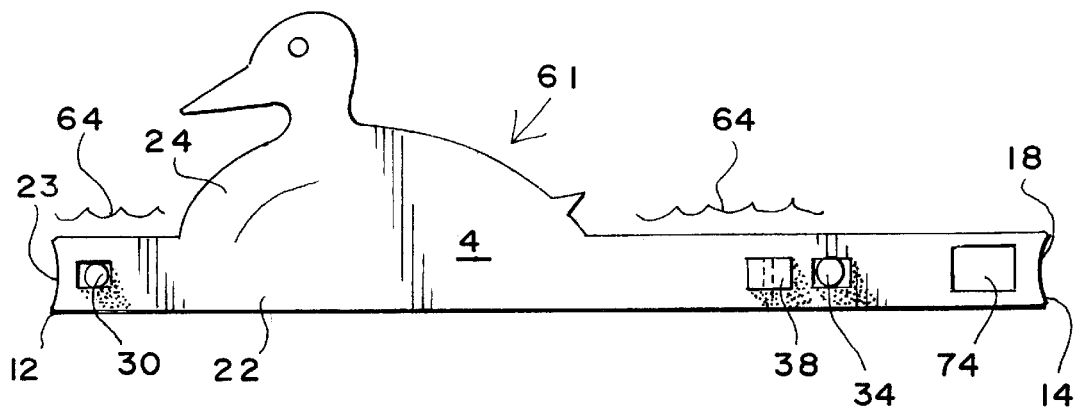
FIG. 4 is a side view of the central member of the waterfowl decoy assembly of the subject invention.

As can be seen from FIGS. 4 and 5 central member 4 has a bottom portion 22 and an upper portion 24 and secondary member 8 has a bottom portion 26 and a top portion 28.

Approximate the first terminal end 12 of central member 4 are a pair of fastening segments 30 and 32. Approximate the second terminal end 18 of central member 4 are a pair fastening segments 34 and 36. Intermediate of fastening segments 30 and 32, and 34 and 36 are a pair of hinge bosses 38 and 40.

The first terminal ends 10 and 14 of secondary members 6 and 8 incorporate fastening segments 42 and 46 which are adapted to cooperate with fastening segments 30 and 32 of central member 4.

The second terminal ends 16 and 20 of secondary members 6 and 8 incorporate hinge bosses 48 and 50 which are adapted to cooperate with hinge bosses 38 and 40 of central member 4. As can be seen from FIG. 4 second terminal end 18 of central member 4 can be further formed into a handle 74.

Further secondary members 6 and 8 incorporate fastening segments 52 and 54 which are adapted to cooperate with fastening segments 34 and 36 of central member 4.

In operation secondary members 6 and 8 are secured to central member 4 by passing hinge pins 56 and 58 through hinge bosses 38, 40 and 50. When secondary members 6 and 8 are secured to central member 4, secondary members 6 and 8 can pivot in relation to the axis of central member 4. When secondary members 6 and 8 are rotated towards terminal end 18 of central member 4, fastening segments 52 and 54 engage fastening segments 34 and 36, thereby locking secondary segments 6 and 8 in angular relationship with central member 4. When this locking relationship is achieved decoy assembly 2 is ready for usage.

The upper portions of central member 4 and secondary members 6 and 8 are formed into the shape of waterfowl 60, 61 and 62.

The volume of bottom portions 22 24 and 26 is such that waterfowl shapes 60, 61 and 62 float approximate water lines 64 and 68 when decoy assembly 2 is disposed in the usage mode as is illustrated in FIG. 2.

For transport and storage secondary members 6 and 8 are swung in the direction of arrows 70 and 72 until they are approximately parallel with the axis of central member 4 at which time fastener segments 42 and 46 engage fastener segments 30 and 32 of central member 4 thereby locking secondary members 6 and 8 into relationship with central member 4. In this mode composite assembly 2 can be easily transported and stored.

Because central member 4 and secondary members 6 and 8 are essentially planar, molds to produce these members from cellular, high density, closed cell, polymeric materials are easily produced.

Central member 4 and secondary members 6 and 8 can be produced by the injection molding of an unfoamed polymeric material into a mold cavity and allowing the unformed material to foam in place until the desired density is achieved. The density is controlled by type of polymeric used, the type of blowing agent used and the volume of polymeric material injected into the mold cavity.

In order to achieve the desired strength to weight ratio the average cell size can be varied to produce a material having the desired density and strength properties.

Figure 6:
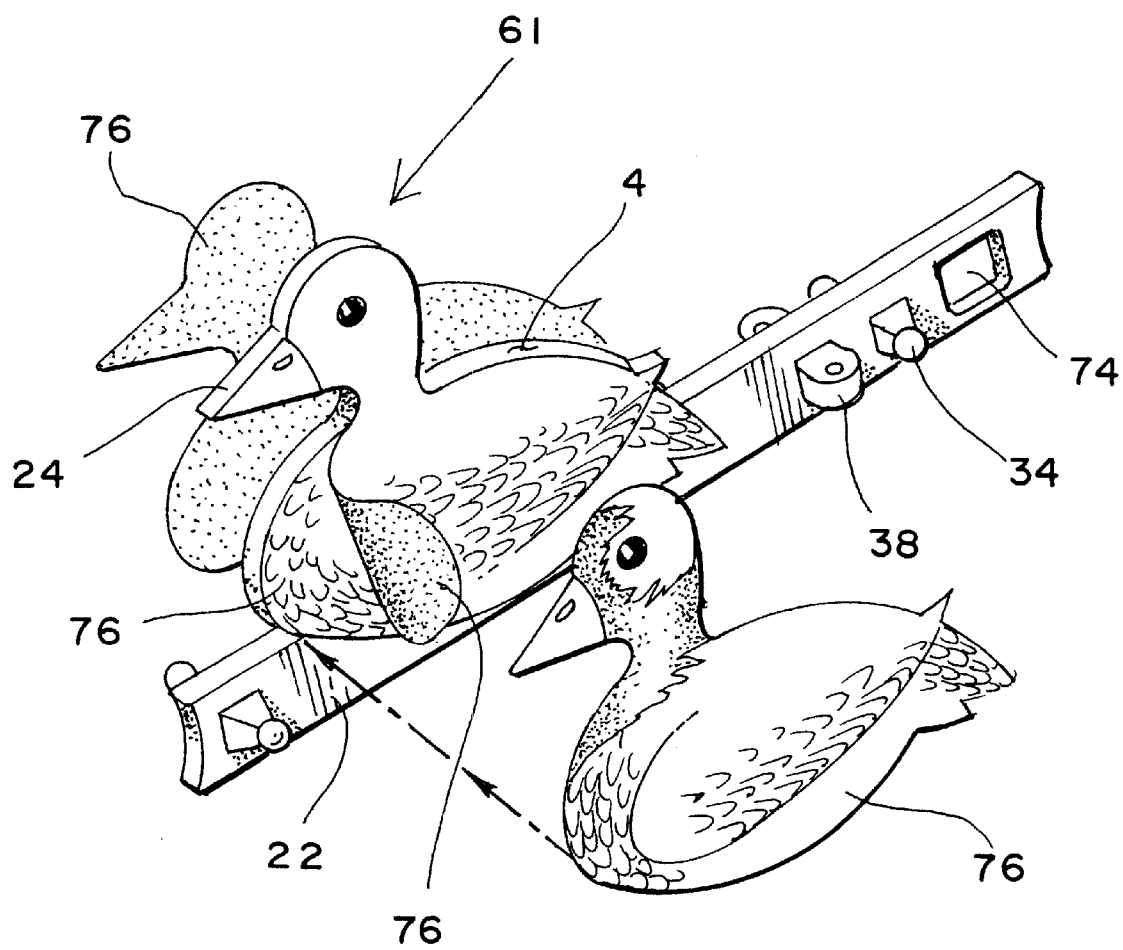
FIG. 6 is a perspective view showing the removal decoy artwork aspects of this invention.

FIG. 6 illustrates that decoy segment 61 may incorporate removable artwork whereby artwork which corresponds to one species of waterfowl can be substituted for that of another species.

Facing 76 may be secured to decoy segment 61 by fastening means such as non drying adhesive, hook and loop fastening systems etc.

In forming central portions 4 and secondary members 6 and 8 coextrusion technologies can be used wherein the upper portions and the bottom portions can be formed from different cellular polymers or cellular polymers having different cell sizes or densities.

The above description and drawings are illustrative of modifications that can be made without departing from the present invention, the scope of which is to be limited only by the following claims.

What is claimed is:

1. A planar multi decoy assembly comprising an elongated central member having a bottom portion and an upper portion the bottom portion having first and second terminal ends, wherein approximate said first and second terminal ends is a pair of opposingly disposed first and second, integral molded fastening segments, intermediate of said first and second fastening segments is a pair of opposingly disposed molded hinge bosses, the upper portion of the central member intermediate of the hinge bosses and the first terminal end is formed into the shape of a waterfowl, a pair of secondary members having upper portions and bottom portions the upper portions of which are formed into the shape of a waterfowl, said secondary members having first and second terminal ends, the second terminal ends being formed into integral molded hinge bosses which are compatible with the integral molded hinge bosses of the central member, whereby the pair of the secondary members are pivotly joined to the central member, via the joining of the hinge bosses, the first terminal ends of the secondary members incorporate integral molded fastening segments which will inter react with the first fastening segments of the central member for purposes of locking the composite structure into a folded up stance, wherein the second terminal ends of the secondary members incorporate integral molded fastening fastening segments which will inter react with the second fastening segments of the central member, for purposes of locking the secondary members into an angular relationship with the central member.

2. The planar multi decoy assembly of claim 1 wherein the second terminal end of the central member is further formed into a handle.

3. The planar multi decoy assembly of claim 1 wherein the bottom portions of the central member and the secondary members have a volume such that the upper portions, which are shaped into the form of a waterfowl, will float in water in a natural fashion when the composite structure is locked in a angular relationship.

4. The planar multi decoy assembly of claim 1 wherein the central member and the secondary members are formed from a closed cell polymeric material having a density of from about 0.22 to about 0.92 gm./c.c.

5. The planar multi decoy assembly of claim 2 wherein the central member and the secondary members are formed from a closed cell polymeric material having a density of from about 0.22 to about 0.92 gm./c.c.

6. The planar multi decoy assembly of claim 3 wherein the central member and the secondary members are formed from a closed cell polymeric material having a density of from about 0.22 to about 0.92 gm./c.c.

7. The planar multi decoy body assembly of claim 1 wherein the fastening segments on the central member are one half of a ball and socket fastener and the fastening segments on the secondary decoy members are the opposite half of the ball and socket fastener.

8. The planar multi decoy body assembly of claim 2 wherein the fastening segments on the central member are one half of a ball and socket fastener and the fastening segments on the secondary decoy members are the opposite half of the ball and socket fastener.

9. The planar multi decoy body assembly of claim 3 wherein the fastening segments on the central member are one half of a ball and socket fastener and the fastening segments on the secondary decoy members are the opposite half of the ball and socket fastener.

10. The planar multi decoy body assembly of claim 4 wherein the fastening segments on the central member are one half of a ball and socket fastener and the fastening segments on the secondary decoy members are the opposite half of the ball and socket fastener.

11. The planar multi decoy body assembly of claim 5 wherein the fastening segments on the central member are one half of a ball and socket fastener and the fastening segments on the secondary decoy members are the opposite half of the ball and socket fastener.

12. The planar multi decoy body assembly of claim 6 wherein the fastening segments on the central member are one half of a ball and socket fastener and the fastening segments on the secondary decoy members are the opposite half of the ball and socket fastener.

13. The planar multi decoy body assembly of claim 1 wherein the upper portions of the central member and the secondary members incorporate changeable facings.

14. The planar multi decoy body assembly of claim 3 wherein the upper portions of the central member and the secondary members incorporate changeable facings.

15. The planar multi decoy body assembly of claim 4 wherein the upper portion of the central and the secondary members incorporate changeable facings.

16. The planar multi decoy body assembly of claim 5 wherein the upper portion of the central member and the secondary members incorporate changeable facings.

17. The planar multi decoy body assembly of claim 6 wherein the upper portion of the central member and the secondary members incorporate changeable facings.

18. The planar multi decoy body assembly of claim 7 wherein the upper portion of the central member and the secondary members incorporate changeable facings.

19. The planar multi decoy body assembly of claim 9 wherein the upper portion of the central member and the secondary members incorporate changeable facings.

\* \* \* \* \*